Aug. 16, 1932.  R. W. BURNETT  1,872,113
HAND BRAKE FOR FLAT CARS AND SIMILAR CARS
Filed June 8, 1928   5 Sheets-Sheet 1
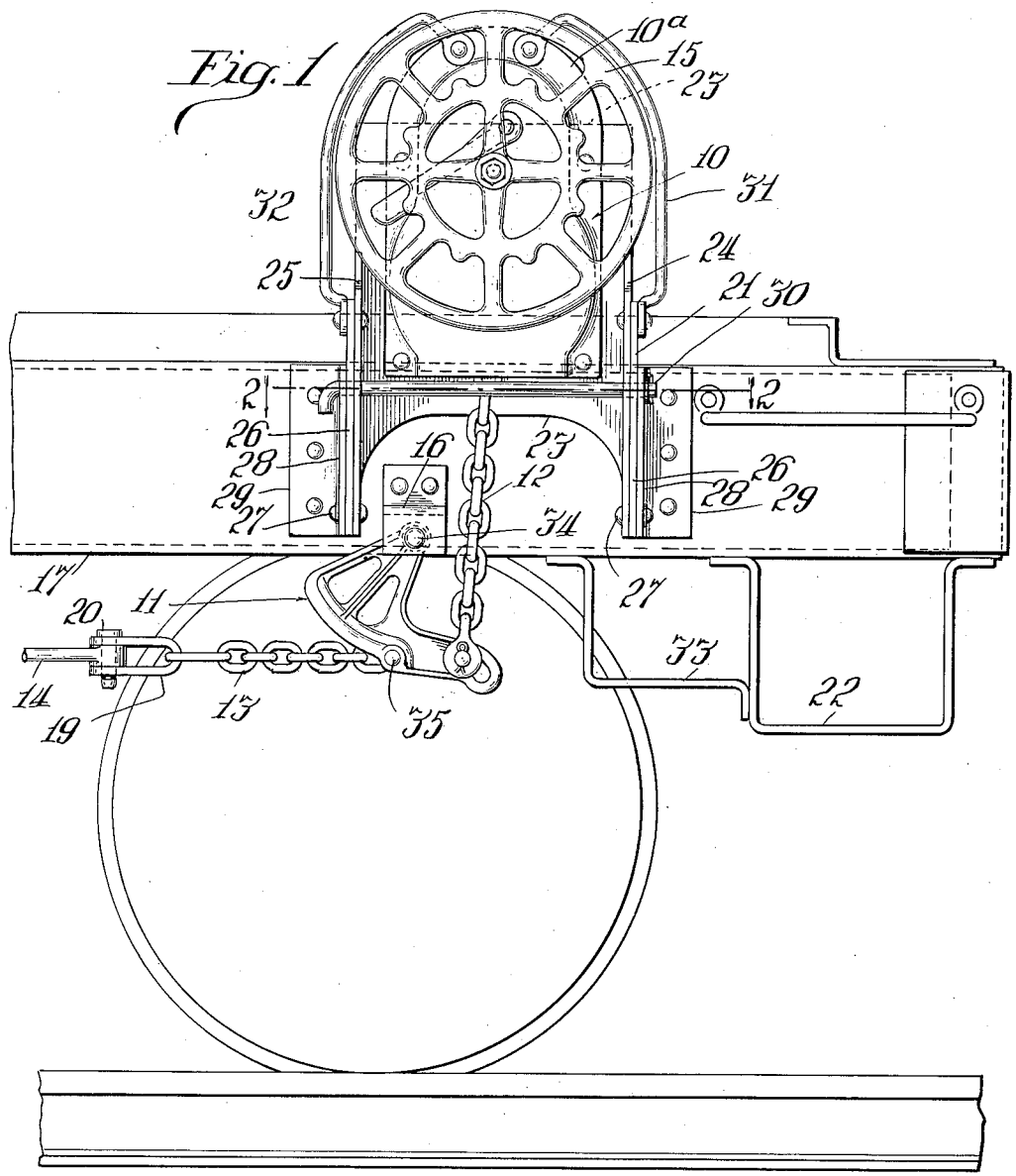
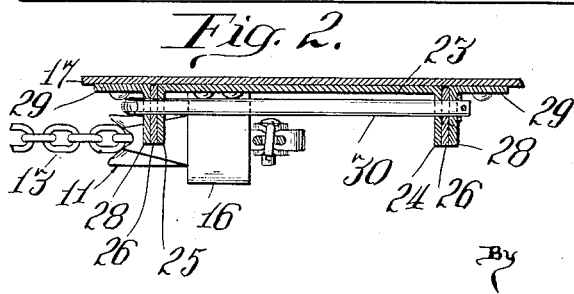
Inventor
Richard W. Burnett
Barnett & Truman
Attorneys

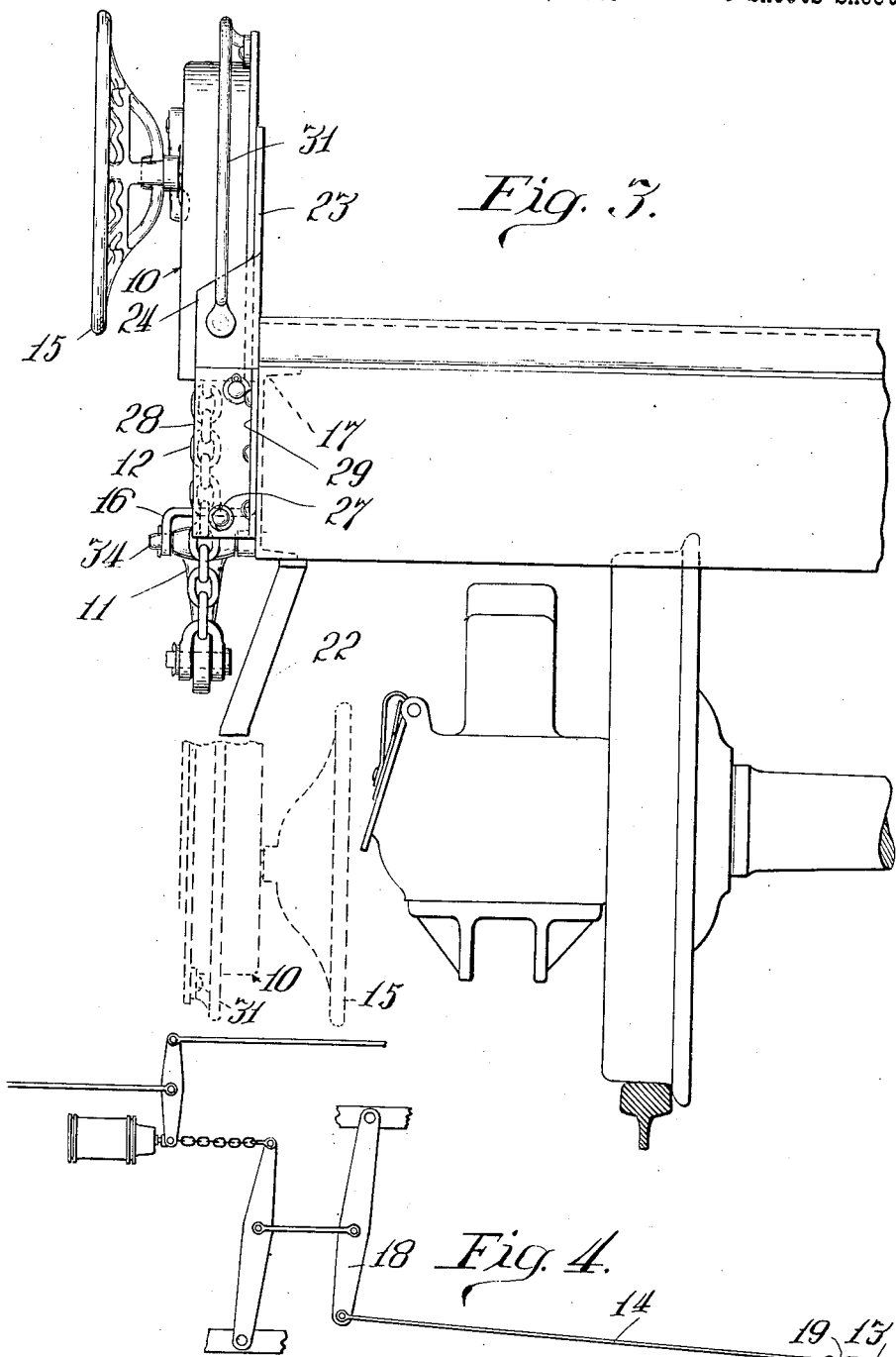

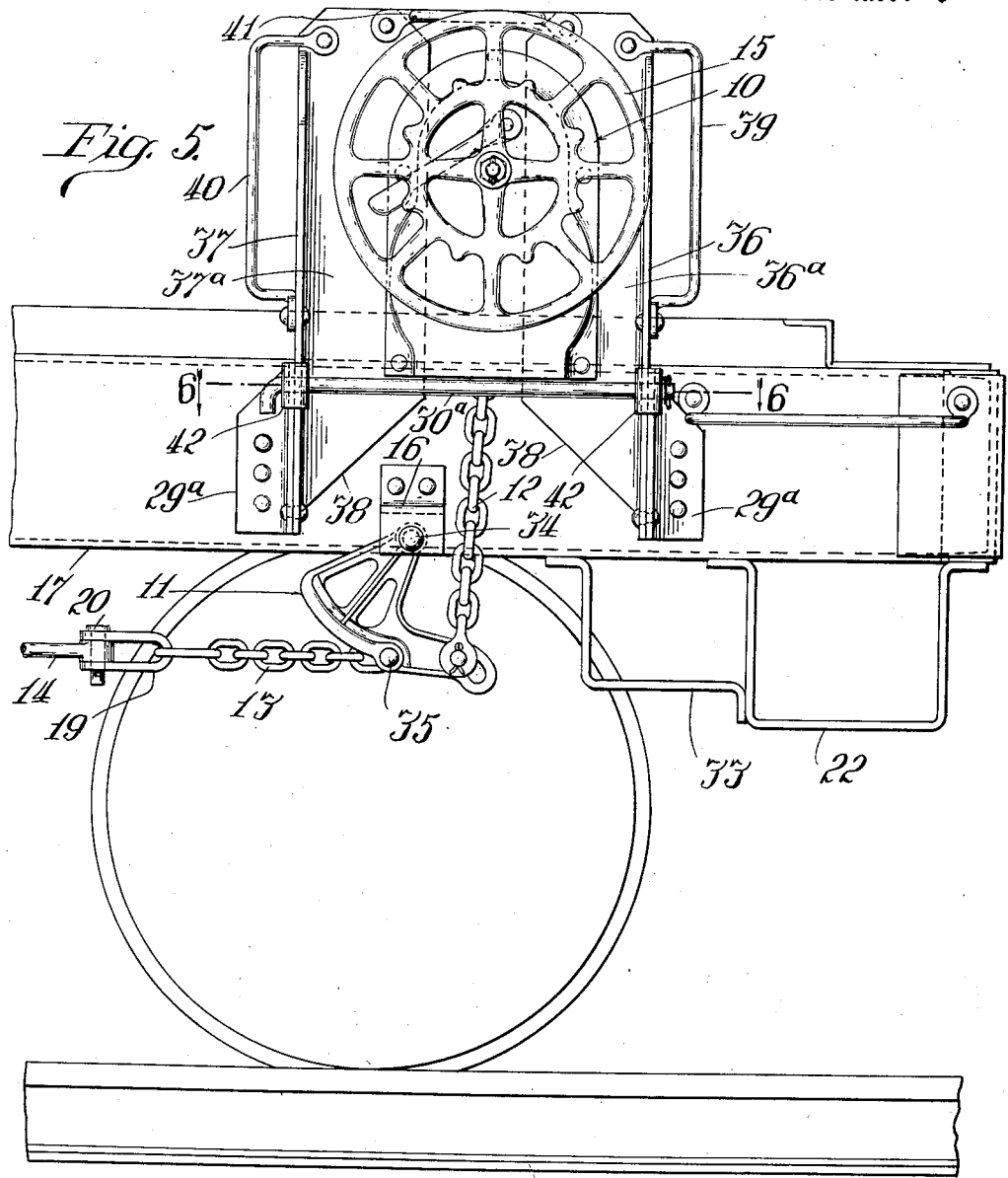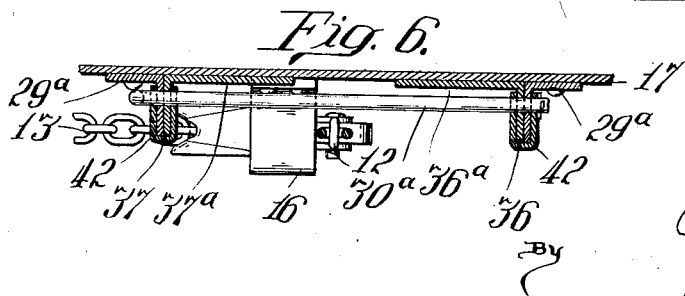

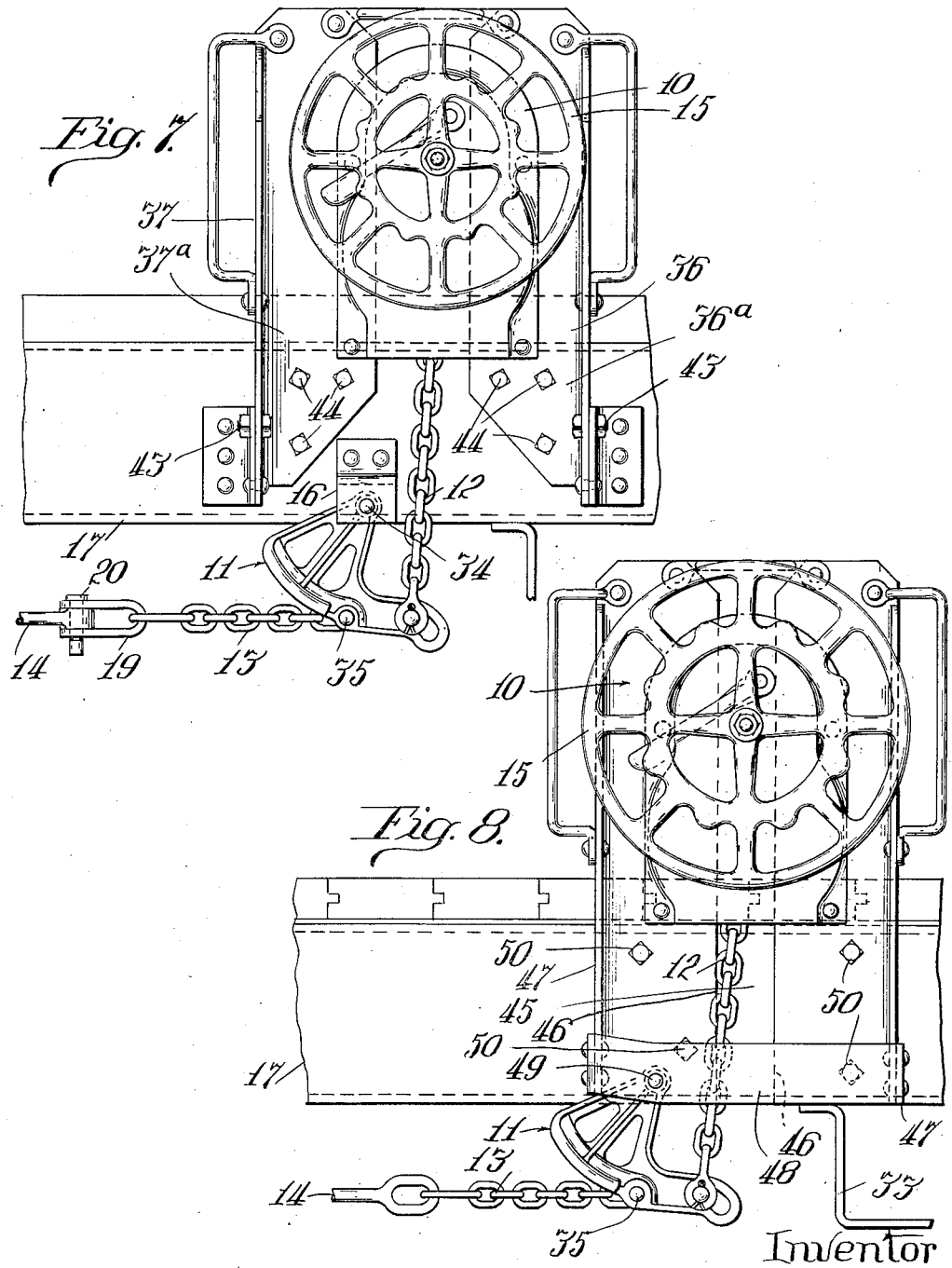

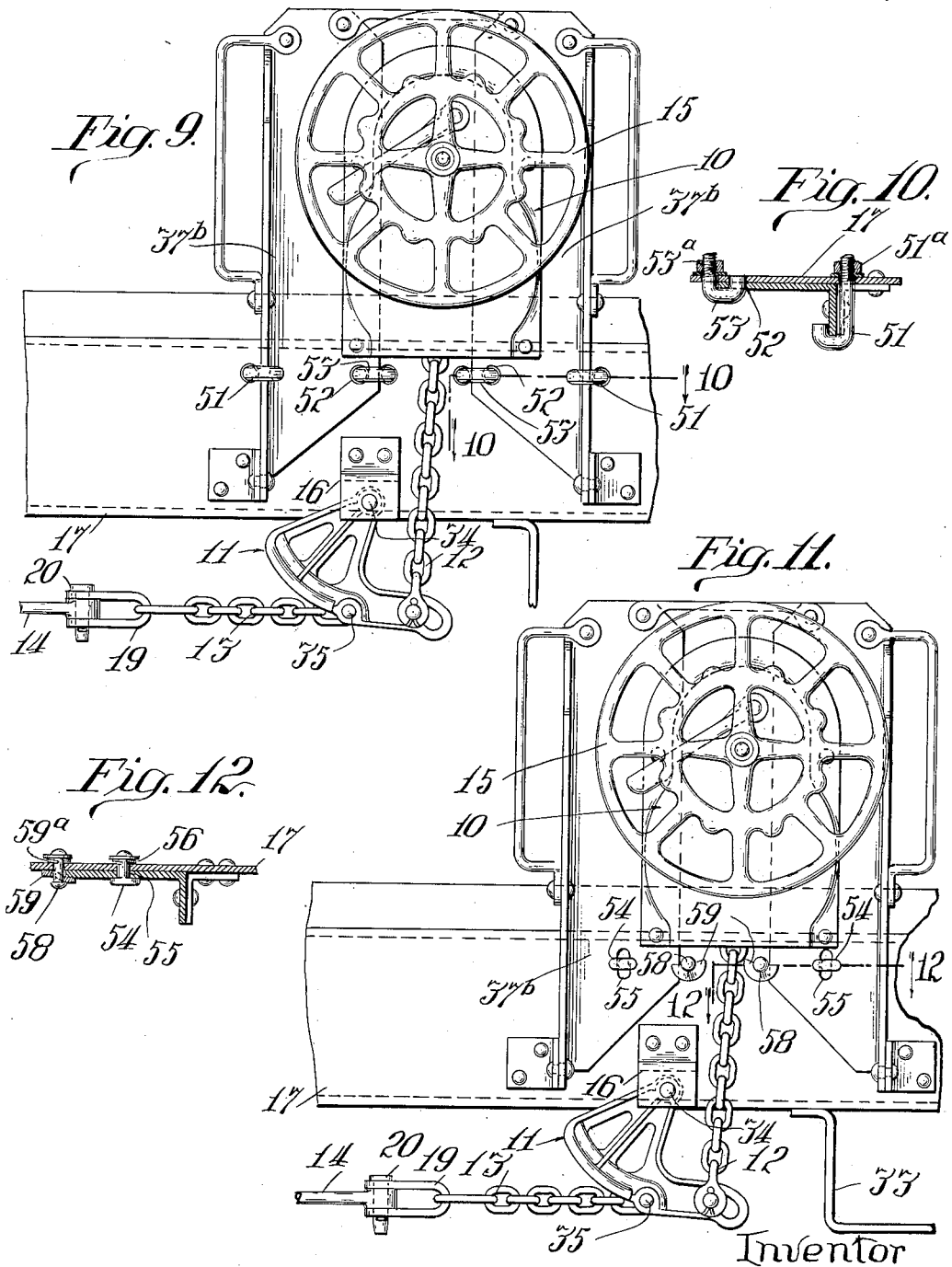

Patented Aug. 16, 1932

1,872,113

UNITED STATES PATENT OFFICE

RICHARD W. BURNETT, OF CHICAGO, ILLINOIS

HAND BRAKE FOR FLAT CARS AND SIMILAR CARS

Application filed June 8, 1928. Serial No. 283,840.

My invention relates to railway car hand brakes and has for its principal object to provide an improved arrangement and means for mounting hand brakes, on railway flat cars or cars of other types adapted for carrying ladings of long material. In this connection the invention contemplates as a specific object to provide an arrangement and mounting whereby the hand brake operating mechanism shown in my application Serial No. 109,061, filed May 14, 1926 may be employed on railway flat cars, drop end gondolas, and cars of similar types. The present invention contemplates an arrangement and construction of the mounting of the hand brake whereby the brakemen in setting or releasing the brakes of a car will not be exposed to the dangers of being injured by the inertia shifting of the lading or by reason of the lack of sufficient standing space on the car.

Another object is to provide a hand brake arrangement for cars of the above general type, whereby the hand brakes will be available for operation at all times without regard to the position of the lading on the car, and which will permit a lading of long material to be placed on adjacent cars without the necessity of re-arranging the cars with relation to each other to avoid interference with the hand brake mechanism.

Another object is to provide a brake mechanism for cars of the above character, which mechanism will provide an arrangement of a hand wheel whereby the brakeman can operate the brakes with maximum efficiency while he is standing on the side step of the car and to also provide in this connection a brake mechanism in which the brakes may be quickly set or released, or otherwise controlled by the brakeman so that the brakeman by such control of the car may avoid sudden stopping of the cars in the railway yards switching of the cars in the railway yards and consequently avoid the inertia displacement of the lading and the expense incident to readjusting the lading on the car.

Another object is to provide an arrangement of hand brakes which when in normal position will not interfere with the loading or unloading of the usual lading of cars of the above type and which may also be lowered so as to facilitate the loading or unloading of unusual cargoes.

The invention is illustrated in certain preferred embodiments in the accompanying drawings, wherein Fig. 1 is a fragmentary side view of a railway flat car showing a railway hand brake applied to the car in accordance with my invention.

Fig. 2 is a sectional view taken on line 2—2 of Fig. 1, looking in the direction indicated by the arrows.

Fig. 3 is an end view of the car showing the hand brake mechanism in its normal operative position and illustrating in dotted lines the lowered position of the hand brake mechanism.

Fig. 4 is a plan view of the brake levers underneath the car illustrating an arrangement of levers when the hand brake mechanism is arranged at the side of the car, as shown in the preceding figures.

Figs. 5 and 6 are views similar to Figs. 1 and 2, but illustrate a modified construction.

Figs. 7 and 8 are views similar to Fig. 5, but illustrate different manners of securing the hand brake mounting to the side structure of the railway car.

Fig. 9 is a side view of the brake mechanism and mounting and illustrating a further modified means for securing the mounting in operative position on the car.

Fig. 10 is a detail sectional view illustrating the construction of the attaching means employed in Fig. 9.

Fig. 11 is a side view of the brake mechanism and mounting illustrating another modified means for attaching the mounting to the side of the car, and Fig. 12 is a sectional view taken on line 12—12 of Fig. 11.

In Figs. 1 to 4 inclusive of the drawings, I have shown one embodiment of my invention in connection with a railway flat car. In this embodiment the hand brake mechanism illustrated is the same in construction as the hand brake operation shown in my copending application Serial No. 109,061, filed May 14, 1926.

While the hand brake mechanism herein shown, due to the use of flexible connectors and the vertically disposed hand wheel, presents certain distinct advantages in connection with the installation of the said mechanism on flat cars, drop end gondolas and other types of cars used for ladings of long material, the invention is not limited to the use of the particular type of hand brake shown.

The hand brake mechanism may be described generally as consisting of a winding mechanism 10, a rocking member 11, a flexible connector 12 for connecting the rocking member to the winding mechanism, and a flexible connector 13 for connecting the rocking member to the hand brake pull rod 14 or other part of the brake rigging underneath the car. Rotation of the hand wheel 15 in a clockwise direction, as viewed in Fig. 1, exerts an upward pull on the connector 12 and consequently rocks the rocking member 11 in a direction to exert a pull on the hand brake rod 14.

In the present invention the rocking member 11 is pivotally supported by a bracket 16 secured to the side sill 17 of the car near one end thereof and is connected by means of the connector 13 and hand brake rod 14 to one end of a lever 18, forming a part of the brake rigging of a car. Preferably the connector 13 is relatively short, so that the clevis 19 and pin 20 connecting it with the rod 14 will be near the side of the car so that the rod and connection may be readily disconnected when it is desired to move the hand brake mechanism to an inoperative position, as will be hereinafter described.

The winding mechanism is enclosed in a suitable housing secured to a frame, designated generally by the reference character 21. The frame, and the winding mechanism secured thereto is disposed at one side of the car near the end thereof, so that it will not interfere with the loading of material on the car and so that the hand wheel 15 may be readily operated by a trainman while the latter is standing on the step 22 of the car.

The frame shown in Figs. 1 to 4, inclusive, consists of a metal plate 23 provided along its vertical edges with outstanding flanges 24 and 25, the lower portions of which are reinforced by meal srips 26—26. The lower ends of the flanges are pivotally secured by bolts 27 to the outstanding flanges 28—28 of supporting brackets 29—29 secured to the outside face of the car side sill 17. In order to support the hand brake mechanism relatively near the floor level of the car, the lower edge of the metal plate 23 is cut away between the flanges 24—25 to provide clearance for the rocking member 11 and the bracket 16. The winding mechanism and the frame on which it is supported are locked in their normal upright positions by means of a bar 30, extending through holes formed in the flanges 24—25 of the frame and through corresponding openings in the flanges 28—28 of the supporting brackets 29.

In order to provide suitable hand holds for the trainmen, vertically extending hand holds 31 and 32 are positioned along opposite sides of the operating mechanism, the upper ends of the hand holds being curved so as to extend partially over the top portion of the hand operating mechanism. The lower ends of the hand holds are secured to the flanges 24—25 of the frame 21 and their upper ends are attached to the flange $10^a$ of the housing for the winding mechanism.

When the car is empty, the trainman will ordinarily operate the hand brake while standing or kneeling on the car floor at the left of the hand brake, as viewed in Fig. 1. In such position the trainman may grasp the hand-hold 32, with his left hand and rotate the hand brake wheel 15 with his right hand. When the lading is so positioned on the car floor that the trainman cannot conveniently operate the brake from the above position, he may operate it while standing on the step 22 of the car. The trainman, under such conditions, will grasp the hand-hold 31 with his right hand and turn the hand wheel 15 with his left hand. In order that the trainman may properly balance himself while operating the hand brake from the step, I preferably form the step 22 so that it will project outwardly from the side sill of the car, as shown best in Fig. 3, and provide also an auxiliary step 33, whereby the trainman may brace himself with his left foot.

With the hand brake arrangement above described, the brake mechanism will be available for operation even though the lading may extend to the end sill of the car or when the lading is in such length that it is so placed on two adjacent cars as to bridge the space between them.

The hand wheel and winding mechanism do not project above the floor of the car to such distance as to interfere with the loading or unloading of material under normal conditions. However, when loading or unloading a car of long material, such as long heavy timbers, girders, or the like, at a place having no crane facilities, the bolt 30 may be withdrawn so as to permit the frame 21 and the winding mechanism thereon to be lowered to the position indicated in dotted lines in Fig. 3. When it is desired to lower the frame 21 to the dotted line position of Fig. 3, the clevis bolt 20 is first withdrawn so as to disconnect the rod 14 and connector 13. The rocking member 11 may be then rotated toward the right of Fig. 1, so as to avoid interference with the downwardly swinging movement of the frame 21. In some installations, like results may be obtained by withdrawing the pivot pin 34 or by disconnecting the connector 13 from the rocking member by withdrawing the bolt 35.

In Figs. 5 and 6, I have shown a modified embodiment in which the frame on which the winding mechanism is supported, instead of being formed from a pressed metal plate, consists of two vertically disposed angle bars 36—37 pivoted at their lower ends to the brackets 29ª—29ª. The winding mechanism housing is attached to the flanges 37—37 of the angle bars so as to rigidify them and hold them in proper spaced relation to each other. The lower ends of the flanges are cut away, as indicated by the reference numeral 38, to provide the desired clearance for the rocking member 11 and the bracket 16. In addition to the vertically extending hand holds 39 and 40, I have secured to the angle bars a hand hold 41, which extends across the top and is secured at opposite ends to the upper ends of the said angle bars. This frame construction is locked in its upright position by means of the locking bar 30ª. In addition to the locking bar, U-shaped clamps 42—42 are driven into frictional clamping engagement with the outwardly projecting flanges of the frame and the brackets on which the frame is supported. The bolt 30ª extends through holes in the ends of each clamp 42, as well as through registering openings in the flanges of the frame and supporting bracket. In other respects this embodiment may be the same as the one shown in Figs. 1 to 4 inclusive.

In Fig. 7 I have shown a modification which is the same as the embodiments shown in Figs. 5 and 6, except that the short locking bolts 43—43 are employed instead of the long bolt 30ª. By the use of the short bolt illustrated, the outstanding flanges of the frame and pivot bracket may be drawn together without the use of the U-shaped clamp, illustrated in the preceding figures. The lower ends of the angle bars 37ª—37ª are bolted to the side sill of the car by a plurality of bolts 44. The bolts 44 may be readily removed when it is desired to swing the hand-operated mechanism to the down position shown in Fig. 3.

In Fig. 8 I have shown another modification of frame. A flat plate 45 is secured to the flanges 46—46 of upstanding angle bars 47 so as to stiffen the angle bars. A yoke strap 48 extends across the lower portion of the frame and is attached to the outstanding flanges of the angle bars. The rocking member 11 is supported between the back plate 45 and the yoke strap 48, by means of a bolt 49 which passes through the said strap, back plate and through the side sill 17 of the car. The lower portion of the frame is also bolted to the side sill of the car by means of bolts 50.

When it is desired to lower the frame, the bolts 50 may be removed and the connector 13 disconnected from the pull rod 14 from the rocking member. The frame may then be lowered by swinging it toward the left of Fig. 8, the pin 49 serving as a pivotal support during the swinging movement.

In Figs. 9 and 10, I have illustrated a modified means for clamping the pivoted frame 37ᵇ to the side sill 17 of the car. In this connection I preferably employ a J-bolt 51, the hooked portion of which fits over the outstanding flange of the frame at opposite sides thereof. The threaded end of the bolt extends through an opening in the side sill 17 of the car. Also preferably I form the flanges of the angle bars with openings 52 which register with corresponding openings in the side sill 17 adapted to receive one end of a smaller J-bolt 53. It will be seen that by tightening the nuts 51ª and 53ª of the bolts 51 and 53, respectively, the pivoted frame will be drawn tightly against the outside face of the side sill 17.

In Figs. 11 and 12, the pivoted frame is clamped to the side face of the car sill 17 by means of T-bolts 54 which extend through slots 55 in the frame so that the heads of the bolts may be turned into alignment with the said slots 55 and the pivoted frame moved outwardly from the side sill without removing the bolt from the side sill. Preferably a spring washer 56 is interposed between the inner face of the side sill 17 and the head 57 of the T-bolt, so as to clamp the frame to the side sill with a resilient pressure. I also use in this connection bolts 58—58 each having a cam shaped head 59 adapted to be forced over the adjacent edge of an angle bar flange of the frame 37ᵇ so as to exert a camming action to clamp the frame 37ᵇ against the side sill 17 of the car. These bolts are also provided preferably with spring washers 59ª each interposed between the inner face of the side sill 17 and the inner head of a bolt.

The present application does not include claims on the hand wheel, housing or the rocking member per se, or on the combination of the hand-power mechanism and the rocking member apart from the means claimed herein for mounting such combination structure on the car. The above devices and combination shown herein are claimed in the order mentioned above in my patent and copending applications as follows: Patent 1,848,822 dated March 8, 1932; applications Serial Nos. 329,243, filed December 29, 1928; 460,407, filed August 31, 1931; 109,061, filed May 14, 1926; and 349,817, filed March 25, 1929.

I claim:

1. In combination with a railway car hand brake comprising a rocking member secured to the car, hand operated power means and means for connecting the rocking member with the power means, of means for movably mounting the power means on the side of the car whereby it may be moved to a position below the floor level of the car to facilitate loading and unloading of the car and without disconnecting the power means from said rocking member.

2. In combination with a railway car hand brake comprising a rocking member secured to the car, hand operated power means and means for connecting the rocking member with the power means, of means for mounting the power means on the side of the car comprising a supporting frame pivoted to the side of the car and adapted to swing outwardly from the plane of the side of the car whereby it may be raised to support the hand operated power means in a position above the floor level of the car or be lowered below said floor level to facilitate the loading and unloading of the car, and means for locking the frame in its raised position.

3. The combination with a railway car hand brake comprising a rocking member secured to the car, hand operated power means and means for connecting the rocking member with the power means, of means for mounting the power means on the side of the car comprising a supporting frame pivoted to the side of the car whereby it may be raised to support the hand-operated power means in a position above the floor level of the car or be lowered below said floor level to facilitate the loading and unloading of the car and a member for releasably holding the frame in its raised position.

4. The combination with a railway car and a hand brake for the same comprising winding mechanism and hand operating means therefor arranged at one side of the car, of means for attaching said winding mechanism to the car comprising a frame, to which said mechanism is secured, pivoted to a side member of the car, and means for releasably holding the frame in its normal upright position.

5. The combination with a railway car and a hand brake for the same comprising hand operated mechanism arranged at one side of the car, of means for attaching said hand operated mechanism to the car comprising brackets secured to the side of the car, a frame to which said mechanism is secured, having flange portions pivoted at their lower ends to said brackets, and means for releasably holding said frame in its normal upright position.

6. The combination with a railway car and a hand brake for the same comprising hand operated mechanism arranged at one side of the car, of means for attaching said hand operated mechanism to the car comprising brackets secured to the side of the car, a frame, to which said mechanism is secured, having flange portions pivoted at their lower ends to said brackets, and a bolt extending through said flanges and brackets for releasably holding said frame in its normal upright position.

7. The combination with a railway car and a hand brake for the same comprising hand operated mechanism arranged at one side of the car, of means for attaching said hand operated mechanism to the car comprising brackets secured to the side sill of the car near the side step thereof, a frame, to which said mechanism is attached, formed from a metal plate provided with outstanding flanges which stop short of the upper margins of the plate and are hinged at their lower ends to said brackets, hand holds secured to said frame in position to be grasped by a trainman while the latter is standing on said car step, and means for releasably holding said frame in its normal upright position.

8. The combination with a railway car and a hand brake for the same comprising hand operated mechanism arranged at one side of the car, of means for attaching said hand operated mechanism to the car comprising brackets secured to the side sill of the car near the end step thereof, a frame to which said mechanism is attached, formed from a metal plate provided with outstanding flanges which stop short of the upper margins of the plate and are hinged at their lower ends to said brackets so as to swing outwardly and downwardly, hand holds secured to said frame in position to be grasped by a trainman while the latter is standing on the said car step, and means for releasably holding said frame in its normal applied position.

9. The combination with a railway car and hand brake for the same comprising hand operated mechanism arranged at one side of the car, of means for attaching said hand operated mechanism to the car comprising brackets secured to the side sill of the car near the side step thereof, a frame, to which said mechanism is attached formed from a metal plate provided with outstanding flanges which stop short of the upper margins of the plate and are hinged at their lower ends to said brackets, hand holds secured to said frame in position to be grasped by a trainman while the latter is standing on said car step, and an auxiliary step member secured to the under frame of the car at one side of the step above referred to, to provide a brace for the trainman during the operation of the hand brake.

10. The combination with a railway flat car, of hand brake mechanism for the car comprising a rocking member secured to the side sill of said flat car, hand operated power means, a flexible connector for connecting the rocking member with the said power means, a flexible connector for connecting said rocking member to the brake rigging underneath the car, and means for pivotally mounting the power means at the side of the car comprising brackets secured to the side sill of the car, a frame member to which said power means is attached pivoted at its lower end to said bracket and a plurality of bolts extending through said frame member and through the side sill of the car to support the frame member in its normal vertical position.

11. The combination with a railway car and hand brake for the same comprising hand operated mechanism arranged at one side of the car, of means for attaching said hand operated mechanism to the car comprising a supporting frame, means providing a pivotal connection of said frame with the car, and a plurality of bolts for holding the frame in its vertical position, but which when removed permits the frame and hand mechanism to rotate about said pivot in a direction longitudinally of the car.

RICHARD W. BURNETT.